(12) United States Patent
Parham et al.

(10) Patent No.: US 8,386,423 B2
(45) Date of Patent: Feb. 26, 2013

(54) SCALABLE POLICY-BASED DATABASE SYNCHRONIZATION OF SCOPES

(75) Inventors: Jeffrey B. Parham, Redmond, WA (US); Mark R. Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/790,330

(22) Filed: May 28, 2010

(65) Prior Publication Data

US 2011/0295802 A1  Dec. 1, 2011

(51) Int. Cl.
*G06F 7/00* (2006.01)
*G06F 17/00* (2006.01)

(52) U.S. Cl. ......... 707/610; 707/625; 707/638; 707/639

(58) Field of Classification Search .................. 707/610, 707/625, 624, 638, 639
See application file for complete search history.

(56) References Cited

U.S. PATENT DOCUMENTS

| | | | |
|---|---|---|---|
| 6,289,357 B1 | 9/2001 | Parker | |
| 6,986,039 B1* | 1/2006 | Leah et al. | 713/155 |
| 7,647,346 B2 | 1/2010 | Silverman et al. | |
| 7,680,835 B2* | 3/2010 | MacLaurin et al. | 707/610 |
| 7,743,019 B2* | 6/2010 | Shah et al. | 707/610 |
| 7,778,963 B2* | 8/2010 | Novik et al. | 707/610 |
| 8,185,495 B2* | 5/2012 | Clark et al. | 707/610 |
| 2005/0038831 A1 | 2/2005 | Souder et al. | |
| 2008/0109496 A1 | 5/2008 | Holenstein et al. | |
| 2008/0307246 A1 | 12/2008 | Rahman et al. | |
| 2009/0198702 A1* | 8/2009 | Novik et al. | 707/10 |
| 2009/0300072 A1 | 12/2009 | Goh et al. | |
| 2010/0235321 A1* | 9/2010 | Shukla et al. | 707/610 |
| 2011/0126047 A1* | 5/2011 | Anderson et al. | 714/15 |
| 2011/0126275 A1* | 5/2011 | Anderson et al. | 726/8 |
| 2011/0158260 A1* | 6/2011 | Piwonka et al. | 370/503 |

OTHER PUBLICATIONS

Ensure Synchronization Server—Published Date: 2001 http://www.darnis.com/images/EnsureDataSheet.pdf (2 pages).
GoldenGate Global Data Synchronization Platform Technical Overview—Published Date: Jan. 2003 http://www.pinsongroup.com/portfolio/GoldenGate%20Technology%20Overview%20White%20Paper.pdf (14 pages).

\* cited by examiner

*Primary Examiner* — Merilyn Nguyen
(74) *Attorney, Agent, or Firm* — Workman Nydegger (57) ABSTRACT

Embodiments are directed to synchronizing scopes between a source database and a target database without the target database specifying each scope that is to be synchronized and to determining scope changes based on service subscriptions. In one scenario, a source database receives from a target database a synchronization scopes policy corresponding to scope criteria provided by the target database. The synchronization scopes policy includes both the scope criteria and a version identifier that together identify a point-in-time snapshot of the set of scopes meeting the scope criteria as of the latest synchronization. The source database resolves the set of scopes last synchronized from the source database to the target database based on the synchronization scopes policy's scope criteria and version identifier. The source database synchronizes to the target database the changes to data in the resolved set of scopes.

16 Claims, 5 Drawing Sheets

SCALABLE POLICY-BASED DATABASE SYNCHRONIZATION OF SCOPES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to store information such as documents, user settings or other state information in databases. These databases are often configured to back up or transfer stored information to other database systems. As changes are made to the original data on a source database, the changes are synchronized to one or more target databases.

Synchronization policies may be implemented that dictate which data changes are (or are not) to be synchronized to a given target database. One form of synchronization policy is a synchronization scopes policy. A synchronization scope is a non-overlapping subset of data and a synchronization scopes policy is a policy allowing changes to be synchronized only if the changes are for data in a specified set of scopes.

BRIEF SUMMARY

Embodiments described herein are directed to synchronizing scopes between a source database and a target database without the target database specifying each scope that is to be synchronized and to determining scope changes based on service subscriptions. In one embodiment, a source database receives from a target database a synchronization scopes policy corresponding to scope criteria provided by the target database. The synchronization scopes policy includes both the scope criteria and a version identifier that together identify either a point-in-time snapshot of the set of scopes that met the scope criteria as of the latest synchronization or an empty set of scopes if no previous synchronization has occurred to the target database. The source database also identifies the set of scopes that met the scope criteria as of the most recent synchronization scopes policy with the same scope criteria.

By comparing the sets of scopes, the source database determines, for each scope, whether to synchronize only the data changes in that scope since the last synchronization, all data changes in that scope regardless of when the changes occurred, no changes in that scope, or the removal of all data in that scope. The source database resolves the set of scopes last synchronized from the source database to the target database based on the synchronization scopes policy's scope criteria and version identifier. The source database then synchronizes to the target database the changes to data in the resolved set of scopes, sends an updated synchronization scopes policy to the target database at the completion of the synchronization of the source database to the target database and supplies the updated synchronization scopes policy as an input to a subsequent synchronization.

In another embodiment, a computer system associates a scope with a tenant so that the scope includes the data of only that tenant. The tenant has various cloud service users. The cloud services are provided by target databases that are configured to store tenant data in a multi-tenant system. The computer system determines that scope criteria match tenants that subscribe to the cloud service associated with a selected target database. The computer system also receives a subscription from the tenant, where the subscription subscribes the tenant to the cloud service provided by the selected target database, and determines that the scopes matching the scope criteria associated with the tenant have changed based on the tenant's subscription to the cloud service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to synchronizing scopes between a source database and a target database without the target database specifying each scope that is to be synchronized and to determining scope changes based on service subscriptions. In one embodiment, a source database receives from a target database a synchronization scopes policy corresponding to scope criteria provided by the target database. The synchronization scopes policy includes both the scope criteria and a version identifier that together identify either a point-in-time snapshot of the set of scopes that met the scope criteria as of the latest synchronization or an empty set of scopes if no previous synchronization has occurred to the target database. The source database also identifies the set of scopes that met the scope criteria as of the most recent synchronization scopes policy with the same scope criteria.

By comparing the sets of scopes, the source database determines, for each scope, whether to synchronize only the data changes in that scope since the last synchronization, all data changes in that scope regardless of when the changes occurred, no changes in that scope, or the removal of all data in that scope. The source database resolves the set of scopes last synchronized from the source database to the target database based on the synchronization scopes policy's scope criteria and version identifier. The source database then synchronizes to the target database the changes to data in the resolved set of scopes, sends an updated synchronization scopes policy to the target database at the completion of the synchronization of the source database to the target database and supplies the updated synchronization scopes policy as an input to a subsequent synchronization.

In another embodiment, a computer system associates a scope with a tenant so that the scope includes the data of only that tenant. The tenant has various cloud service users. The cloud services are provided by target databases that are configured to store tenant data in a multi-tenant system. The computer system determines that scope criteria match tenants that subscribe to the cloud service associated with a selected target database. The computer system also receives a subscription from the tenant, where the subscription subscribes the tenant to the cloud service provided by the selected target database, and determines that the scopes matching the scope criteria associated with the tenant have changed based on the tenant's subscription to the cloud service.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
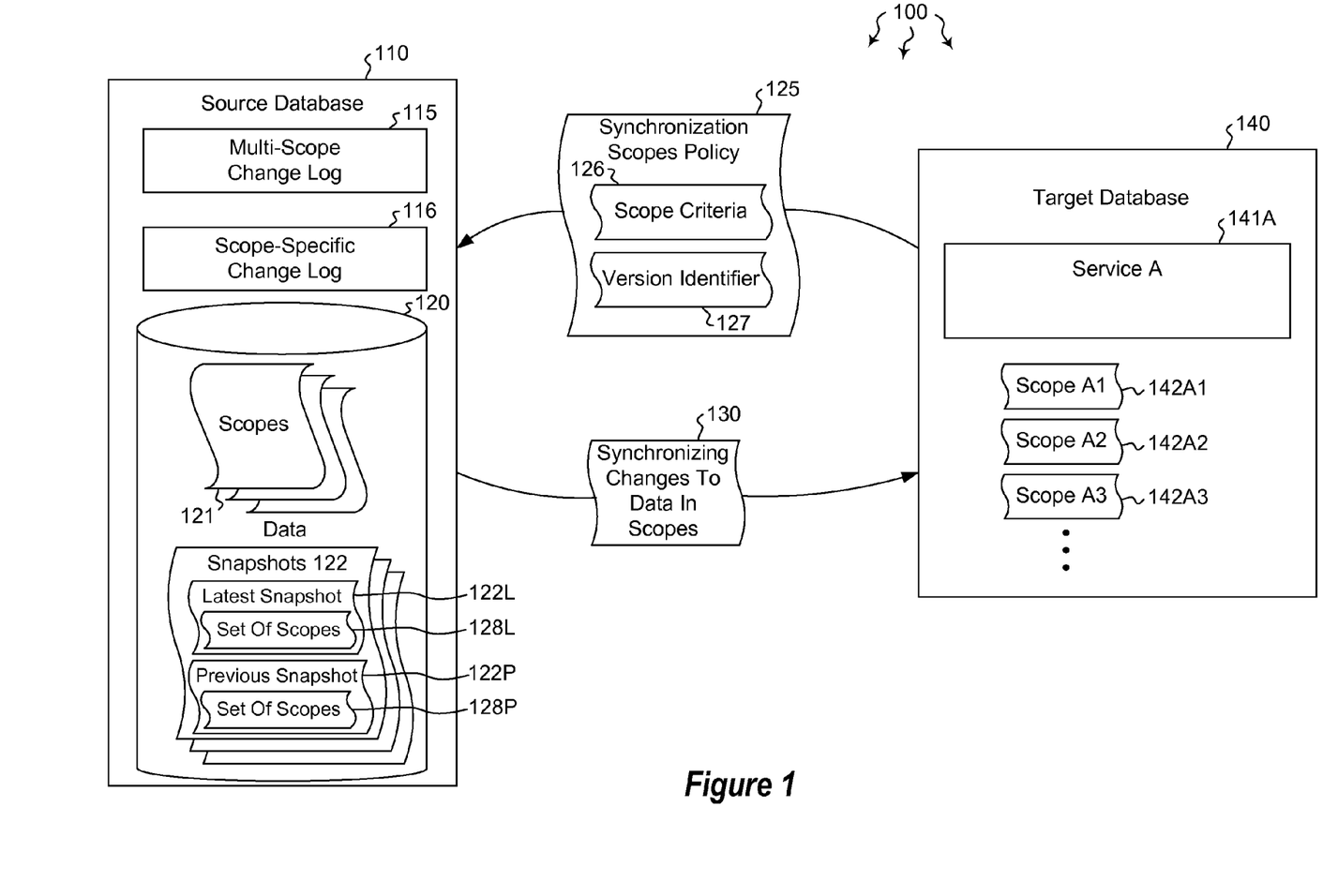
FIG. 1 illustrates a computer architecture in which embodiments of the present invention may operate including synchronizing scopes between a source database and a target database without the target database specifying each scope that is to be synchronized.

FIG. 1 illustrates a computer architecture 100 in which the principles of the present invention may be employed. Computer architecture 100 includes various databases including source database 110 and target database 140. These databases may include any type of database or data store that are used to store and provide access to data. Source database 110, as used herein, may refer to a database that acts as a back end, providing requested data to the services provided by the target database. Target database 140, as used herein, may refer to a front end database that provides various services to multiple different users that subscribe to those services. The services to which the user subscribes may be referred to herein as the user's set of subscriptions. As the user's set of subscriptions change over time on the source database, the target database data may become out of date. Synchronizations are used to keep the source and target databases current on data changes for scopes that meet the scope criteria associated with each target database.

The data 120 of source database 110 may be organized into various scopes 121. The scopes may include data for a particular user, program, data partition, group of users, tenant, customer, set of programs or other user-selected criteria. In some embodiments, each unit of data belongs to exactly one scope. For instance, in a multi-tenant system, each tenant's scope may include all the data for that tenant. Thus, if that tenant is subscribed to, for example, service A (141A), the tenant's scope would include data that may be accessed by service A. The tenant may include multiple different users. Each of the tenant's users' data is included in the tenant's scope. Accordingly, each unit of user data is associated with the tenant's scope. Such data-scope associations may be synchronized according to synchronization scopes policy 125. Synchronizing the scopes according to the policy allows data changes to be synchronized without individually specifying each scope that is to be synchronized.

In some cases, the synchronization scopes policy may include scope criteria 126 and version identifier 127. The scope criteria identify which scopes are to be synchronized. The scopes matching the scope criteria may change over time. Together, the version identifier and scope criteria identify a point-in-time snapshot of the set of scopes that meet the scope criteria 126.

For instance, target database 140 may include data for a given service (e.g. service 141A. It will be understood that while only one service is shown here, target database may provide many different services. Service 141A may have one or more subscribers. Each subscriber has a corresponding scope stored in target database 140. For instance, scope A1 (142A1) may correspond to a first subscribed tenant, scope A2 (142A2) may correspond to a second subscribed tenant and scope A3 (142A3) may correspond to a third subscribed tenant. As indicated by the downward ellipses, many other tenant subscribers may have corresponding scopes stored in the target database.

In some embodiments, the synchronization scopes policy 125 may indicate that the scopes of service A (e.g. scopes 142A1-142A3) are to be synchronized. Accordingly, in such a case, service identifier 126 would identify "subscribes to service A" as the scope criteria for scopes to be synchronized. The version number 127, along with the scope criteria, identifies the scopes that matched the scope criteria at a given point in time. In some cases, the source database 110 may store a version number for each target database with which it is associated. In other implementations, the source database may communicate the version to a target database at the end of synchronization, whereupon the target database may echo the version back to the source database on the next synchronization. These concepts will be explained in greater detail below with regard to method 200 of FIG. 2.

Figure 2:
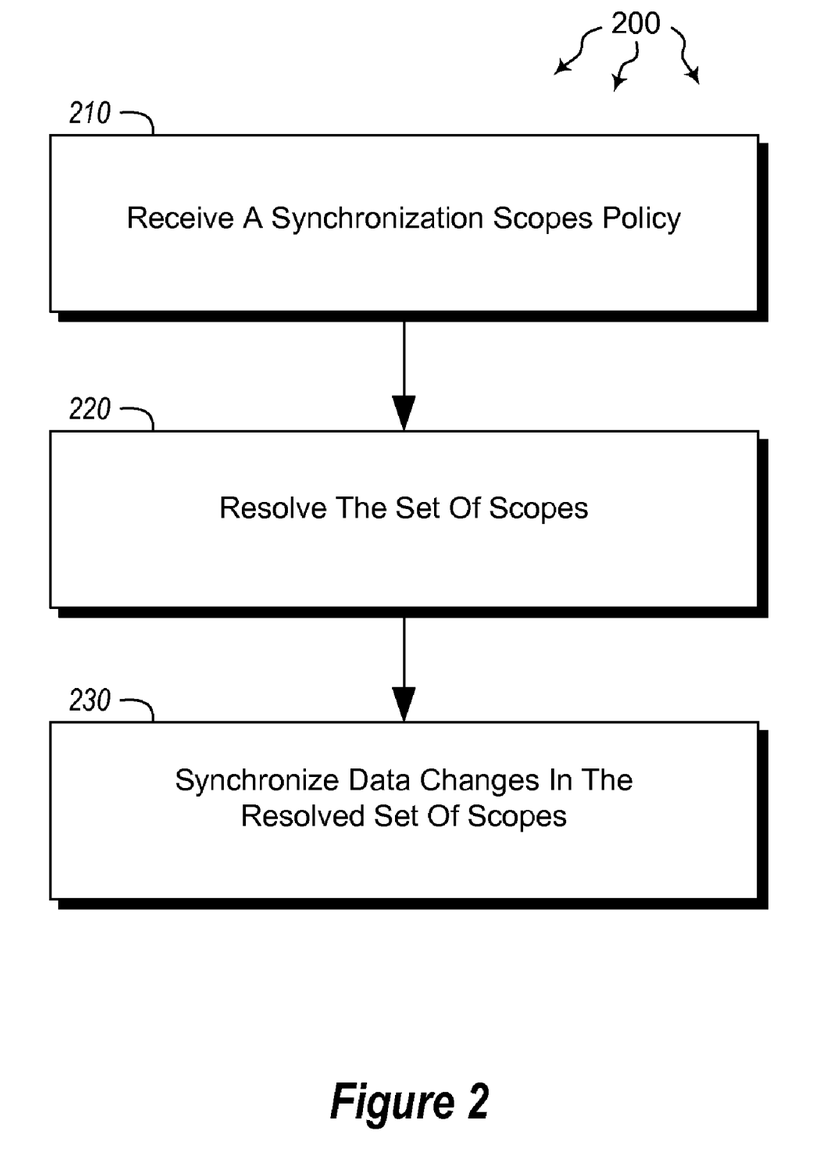
FIG. 2 illustrates a flowchart of an example method for synchronizing scopes between a source database and a target database without the target database specifying each scope that is to be synchronized.
Figure 3:
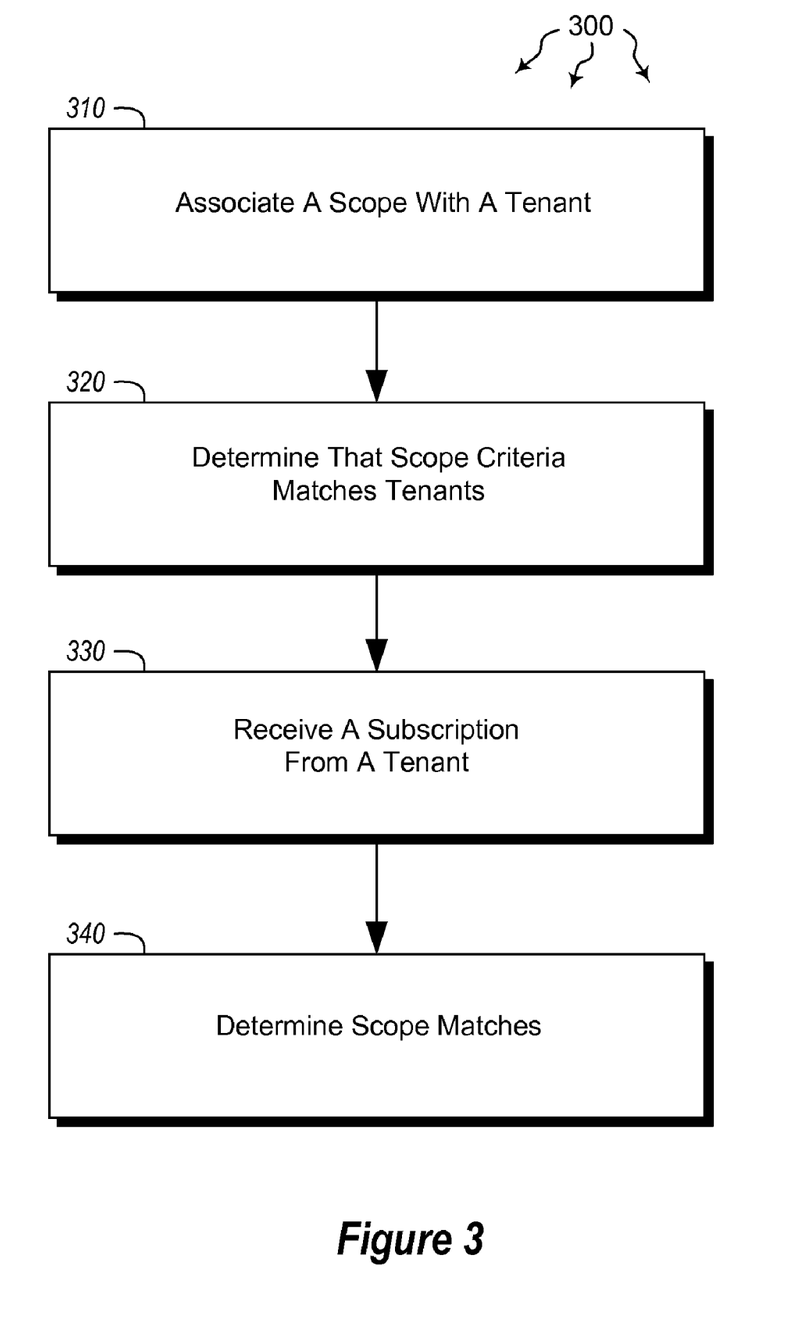
FIG. 3 illustrates a flowchart of an example method for determining scope changes based on service subscriptions.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for synchronizing scopes between a source database and a target database without the target database specifying each scope that is to be synchronized. The method 200 will now be described with frequent reference to the components and data of environment 100 of FIG. 1 and environment 500 of FIG. 5.

Method 200 includes an act of a source database receiving from a target database a synchronization scopes policy from the target database, the synchronization scopes policy including both the scope criteria and a version identifier that together identify at least one of a point-in-time snapshot 122 of the set of scopes meeting the scope criteria as of the latest synchronization, and an empty set of scopes if no previous synchronization has occurred (act 210). For example, source database 110 may receive synchronization scopes policy 125 from target database 140. The policy may include scope criteria 126 that match scopes to be synchronized to the target database (e.g. scope A1 (142A1)). The policy may also include version identifier 127 which, together with the scope criteria, identifies a point-in-time snapshot 122 of those scopes that meet or match the scope criteria (i.e. the set of scopes the target database has already synchronized). If no synchronization to the target database has yet occurred (which may be denoted with a version identifier of 0, for example), this set of scopes is the empty set.

In some cases, each scope (e.g. scope A1) may correspond to a particular user. The user may be a subscriber to a web service provided by the target database such as an email service, a word processing service, a spreadsheet service or any other type of service. Thus, in such cases, the data within a particular scope (e.g. scope A1) may include all the information stored by the service for that user. Then, as any given user subscribes or unsubscribes from the service, that user's corresponding scope may then begin to match the scope criteria or stop matching the scope criteria.

In some cases, the source database 110 may identify the most recent point-in-time snapshot (latest snapshot 122L) among stored point-in-time snapshots 122, where the latest snapshot includes the set of scopes 128L matching the scope criteria 126. The source database may identify the most recent snapshot by retrieving the most recent synchronization scopes policy 125 which includes the same scope criteria as the synchronization scopes policy associated with the target database.

Method 200 includes an act of the source database resolving the set of scopes last synchronized from the source database to the target database based on the synchronization scopes policy's scope criteria and version identifier (act 220). The source database resolves the set of scopes identified by the synchronization scopes policy. The source database then compares the most recent snapshot (122L) to another previous point-in-time snapshot of an earlier point in time (e.g. previous snapshot 122P). Changes to data in a given scope (e.g. scope A1) may be synchronized differently based on whether the scope is in the set of scopes of the most recent snapshot (scopes 128L in snapshot 122L), is in the set of scopes of the previously stored snapshot (scopes 128P in snapshot 122P), is in both scope sets, or is in neither scope set.

Figure 5:
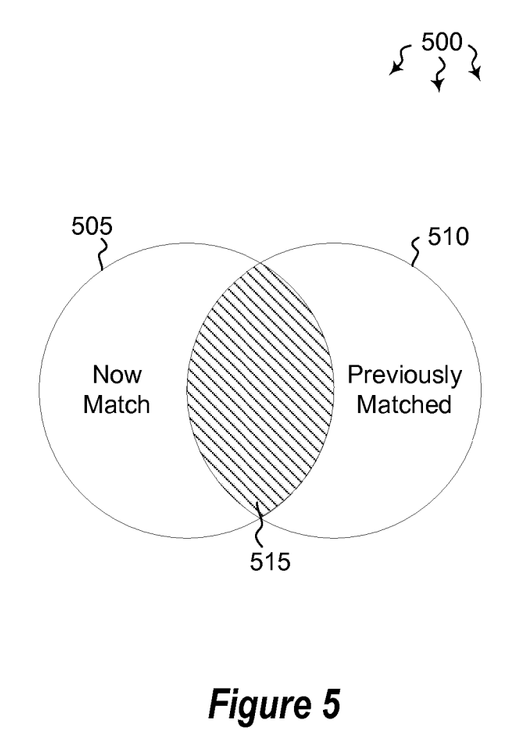
FIG. 5 illustrates a Venn diagram that shows different scope categories.

For example, in FIG. 5, scopes 128P may be represented as region 510 ("Previously Matched") and set 128L may be represented as region 505 ("Now Match"). If scope A1 is a member of both set 128P and set 128L (region 515), the source database synchronizes changes to data in scope A1 that occurred since the last synchronization to the target database (or all changes to data in scope A1 if this is the first synchronization to the target database). If scope A1 is a member of set 128P but not set 128L (region 510 less region 515), the source database synchronizes to the target database the removal of all data in scope A1.

If scope A1 is a member of set 128L (now matches) but not set 128P (previously matched) (region 505 less region 515), the source database synchronizes to the target database all changes to data in scope A1, regardless of when the changes occurred. If scope A1 is a member of neither set 128L nor set 128P (outside both region 505 and region 510), the source database synchronizes to the target database no changes to data in scope A1.

Returning to FIG. 2, method 200 includes an act of the source database synchronizing to the target database changes to data in the resolved set of scopes. For example, source database 110 may synchronize to target database 140 changes to data in scope set 128L. In some cases, the source database may send an updated synchronization scopes policy to the target database at the completion of the synchronization of the source database to the target database. In this manner, the updated synchronization scopes policy may be supplied as an input to one or more subsequent synchronizations.

In some embodiments, the data for a user is in a scope which includes data only for that user. That scope is a member of the scope sets pointed to in the current versions of one or more synchronization scopes policies. If the user is deleted from the database (e.g. as the result of an unsubscription to all services), the user's set of scopes are absent from the subsequent versions of those synchronization scopes policies such that those scopes are no longer synchronized. In another example, a user may subscribe or unsubscribe from one or more services. The user's scope may thus be added (if the user subscribed) or removed (if the user unsubscribed) from the set of scopes that match the scope criteria. In still other cases, a customer or tenant with multiple different users may subscribe or unsubscribe from a service. Thus, the scope corresponding to the tenant (and, as a result, all of the tenant's users) is similarly added or removed based on whether the customer subscribed or unsubscribed from the service.

In some cases, source database 110 may implement a heuristic to determine which of the following two options is the most efficient: utilizing a change log that spans all scopes (e.g. multi-scope change log 115) or utilizing a change log for each scope (e.g. scope-specific change log 116). For example, in some scenarios, it may be more efficient to use multi-scope change log 115 that stores information for all scopes.

In other scenarios, it may be more efficient to use a separate, scope-specific change log for each scope. The heuristic may look at many different items to make the determination including total number of scopes being synchronized, total number of services provided, total number of users, latency between databases and other factors. Thus, the source database may efficiently enumerate changes by iterating through each scope in the scope set of the synchronization scopes policy and enumerate the changes to the data in that scope (i.e. a per-scope change log). Or, the source database may iterate through all changes and then ignore or skip changes to data in scopes that are not in the scope set of the synchronization scopes policy (i.e. global (not per-scope) change log). The heuristic may be used to determine whether a per-scope change log or a global change log is optimal.

FIG. 3 illustrates a flowchart of a method 300 for determining scope changes based on service subscriptions. The method 300 will now be described with frequent reference to the components and data of environment 100 of FIG. 1, environment 400 of FIG. 4, and environment 500 of FIG. 5.

Method 300 includes an act of associating a scope with a tenant such that the scope includes the data of only that tenant, the tenant comprising one or more cloud service users, wherein the cloud services are provided by one or more target databases that are configured to store tenant data in a multi-tenant system. For example, scope A1 (142A1) may be associated with a tenant that has multiple different cloud service users. Scope A1 may thus include the data of that tenant (and its users). In some embodiments, service A (141A) may be a cloud service provided by a single target database 140 or by multiple different target databases. Such target databases may be configured to store tenant data as part of a multi-tenant system, where each tenant has (is) its own scope.

Method 300 also includes an act of determining that scope criteria match tenants that subscribe to the cloud service associated with a selected target database. For example, source database 110 may determine that scope criteria match one or more tenants that subscribe to cloud service A which is provided by target database 140. The data may be matched as described above in relation to FIG. 5 with sets of scopes that now match (505), sets of scopes that previously matched (510) and sets of scopes that now match the scope criteria 126 and that previously matched the scope criteria.

Method 300 includes an act of receiving a subscription from the tenant, wherein the subscription subscribes the tenant to the cloud service provided by the selected target database. Source database may receive a subscription from any of a plurality of different tenants. The subscription may subscribe the tenant to cloud service A (141A) provided by target database 140.

Method 300 further includes an act of determining that the scopes matching the scope criteria associated with the tenant have changed based on the tenant's subscription to the cloud service. For instance, source database 110 may determine that scopes 128L in snapshot 122L matching the scope criteria 126 associated with the tenant have changed, based on the tenant's subscription to cloud service A.

Figure 4:
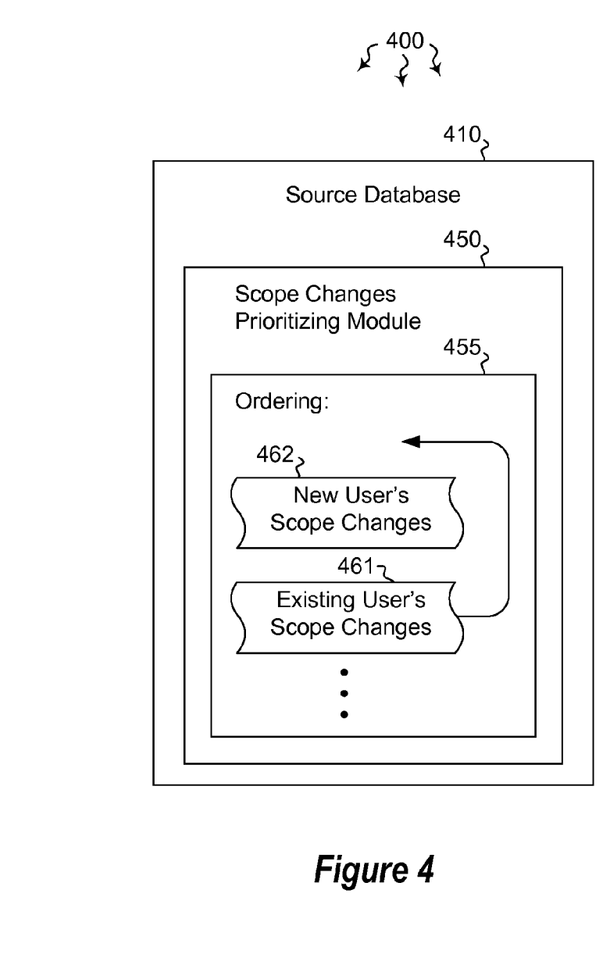
FIG. 4 illustrates an embodiment in which scope changes are received and implemented at a source database.

Referring to FIG. 5, in some cases, synchronization of such changes may be prioritized such that changes to data in scopes in region 515 are synchronized before changes to data in scopes outside region 515. For example, scope changes prioritizing module 450 of source database 410 may prioritize those changes to data in a scope in region 515 (461) over changes to data in a scope in region 505 less region 515 (462) (as shown in ordering box 455). As used herein, scopes in region 515 are "existing scopes" that were previously synchronized to the target database. Scopes in region 505 less region 515 are "new scopes" that have not yet been synchronized to the target database, but that should now be, according to the scope criteria of the synchronization scopes policy. Scopes in region 510 less region 515 are "removed scopes" that were previously synchronized to the target database but should not now be, according to the scope criteria of the synchronization scopes policy. This prioritizing may have a notable effect in cases where large numbers of changes or large numbers of scopes are involved, significantly reducing the delay between a change occurring in the source database and that change being synchronized to target databases for data in "existing scopes".

In some embodiments, the source database may recheck the scopes to determine whether changes to data in an existing scope (461) were made while changes to data in a new scope (462) or a removed scope were being synchronized. If so, those changes may be synchronized before synchronizing any more changes in the new scope (or in any other new scope, or in a removed scope). A user may configure a policy (e.g. policy 125) to make such prioritizations automatic. Thus, according to policy, synchronization of changes to data in existing scopes may be synchronized before changes to data in new scopes or removed scopes, regardless of when the changes to data in existing scopes are made and even if the changes are made while changes to data in new scopes or removed scopes are being synchronized.

In some cases, source database 110 may further determine that a tenant has unsubscribed from one of the cloud services to which the tenant was previously subscribed. The source database may then determine that the scopes matching the scope criteria associated with the tenant have changed based on the tenant's unsubscription from the cloud service provided by the selected target database. Thereafter, the source database may send an updated synchronization scopes policy to the target database upon completion of a synchronization of the source database to the target database.

Accordingly, methods, systems and computer program products are provided which describe synchronizing scopes between a source database and a target database without the target database specifying each scope that is to be synchronized, as well as to prioritizing changes in scopes that are to be synchronized based on a synchronization scopes policy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for synchronizing scopes between a source database and a target database without the target database specifying each scope that is to be synchronized, the method comprising:
    an act of a source database receiving from a target database a synchronization scopes policy corresponding to scope criteria provided by the target database, the synchronization scopes policy including both the scope criteria and a version identifier that together identify at least one of a point-in-time snapshot of a set of scopes meeting the scope criteria as of a latest synchronization, and an empty set of scopes if no previous synchronization has occurred, wherein changes to data in a given scope are synchronized differently based on which point-in-time snapshots the scope is a member of;
    an act of the source database resolving the set of scopes last synchronized from the source database to the target database based on the point-in-time snapshot of the set of scopes that matched the synchronization scopes policy's scope criteria and version identifier;
    an act of the source database synchronizing to the target database one or more changes to data in the resolved set of scopes based on which scopes were part of the point-in-time snapshot;
    an act of sending an updated synchronization scopes policy to the target database upon completion of the synchronization of the source database to the target database; and
    an act of supplying the updated synchronization scopes policy as an input to a subsequent synchronization.

2. The method of claim 1, wherein the source database maintains a change log that spans scopes.

3. The method of claim 1, wherein the source database implements a heuristic to determine which is the most efficient to enumerate changes to data: utilizing a change log that spans all scopes or utilizing a change log for each scope.

4. The method of claim 1, wherein the source database determines which scopes have been added and which scopes have been removed by analyzing differences between the set of scopes identified by the synchronization scopes policy associated with completion of the last synchronization and the set of scopes that met the scope criteria as of a most recent synchronization scopes policy.

5. The method of claim 4, further comprising synchronizing changes to data in each added scope, as determined by the difference analysis, regardless of when the changes were made.

6. The method of claim 5, further comprising synchronizing only the changes since the last synchronization for data in scopes where a scope was included in the synchronization scopes policy associated with the target database at the end of the last synchronization, and wherein the scope still meets the scope criteria, as determined by the difference analysis.

7. The method of claim 5, further comprising synchronizing the removal of all data in scopes where the scope was included in the synchronization scopes policy associated with the target database at the end of the last synchronization but where the scope no longer meets the scope criteria, as determined by the difference analysis.

8. The method of claim 5, further comprising synchronizing no changes to data in any scope that is not included in the synchronization scopes policy associated with the target database at the end of the last synchronization and, wherein the scope still does not meet the scope criteria, as determined by the difference analysis.

9. The method of claim 5, further comprising treating a first synchronization to the target database the same as any subsequent synchronization where the synchronization scopes policy of the last synchronization resolves to an empty set of scopes.

10. The method of claim 5, further comprising synchronizing changes to data in any existing scopes before changes to data in other scopes, wherein the existing scope comprises a scope that was included in the synchronization scopes policy associated with the target database at the end of the last synchronization, and wherein the scope still meets the scope criteria, as determined by the difference analysis.

11. The method of claim 10, further comprising an act of rechecking existing scopes to determine whether changes to data in existing scopes were made while the changes to data in scopes that are not existing scopes were being synchronized.

12. A computer system comprising the following:
    one or more processors;
    system memory;
    one or more computer-readable storage media having stored thereon computer-executable instructions that, when executed by the one or more processors, causes the computing system to perform a method for synchronizing scopes between a source database and a target database without the target database specifying each scope that is to be synchronized, the method comprising the following:
    an act of a source database receiving from a target database a synchronization scopes policy corresponding to scope criteria provided by the target database, the synchronization scopes policy including both the scope criteria and a version identifier that together identify at least one of a point-in-time snapshot of a set of scopes meeting the scope criteria as of a latest synchronization, and an empty set of scopes if no previous synchronization has occurred, wherein changes to data in a given scope are synchronized differently based on which point-in-time snapshots the scope is a member of;

an act of the source database resolving the set of scopes last synchronized from the source database to the target database based on the point-in-time snapshot of the set of scopes that matched the synchronization scopes policy's scope criteria and version identifier;

an act of the source database synchronizing to the target database one or more changes to data in the resolved set of scopes based on which scopes were part of the point-in-time snapshot;

an act of sending an updated synchronization scopes policy to the target database upon completion of the synchronization of the source database to the target database; and an act of supplying the updated synchronization scopes policy as an input to a subsequent synchronization.

13. The computer system of claim 12, wherein the source database determines which scopes have been added and which scopes have been removed by analyzing differences between the set of scopes identified by the synchronization scopes policy associated with completion of the last synchronization and the set of scopes that met the scope criteria as of a most recent synchronization scopes policy.

14. The computer system of claim 13, further comprising synchronizing changes to data in each added scope, as determined by the difference analysis, regardless of when the changes were made.

15. The computer system of claim 14, further comprising synchronizing only the changes since the last synchronization for data in scopes where a scope was included in the synchronization scopes policy associated with the target database at the end of the last synchronization, and wherein the scope still meets the scope criteria, as determined by the difference analysis.

16. At a computer system including a processor and a memory, in a computer networking environment including a plurality of computing systems, a computer-implemented method for synchronizing scopes between a source database and a target database without the target database specifying each scope that is to be synchronized, the method comprising:

an act of a source database receiving from a target database a synchronization scopes policy corresponding to scope criteria provided by the target database, the synchronization scopes policy including both the scope criteria and a version identifier that together identify at least one of a point-in-time snapshot of a set of scopes meeting the scope criteria as of a latest synchronization, and an empty set of scopes if no previous synchronization has occurred;

an act of the source database determining which scopes have been added and which scopes have been removed by analyzing differences between the set of scopes identified by the synchronization scopes policy associated with completion of a last synchronization and the set of scopes that met the scope criteria as of a most recent synchronization scopes policy;

an act of the source database resolving the set of scopes last synchronized from the source database to the target database based on the synchronization scopes policy's scope criteria and version identifier;

an act of the source database synchronizing to the target database one or more changes to data in the resolved set of scopes based on which scopes were part of the point-in-time snapshot;

an act of sending an updated synchronization scopes policy to the target database upon completion of the synchronization of the source database to the target database; and an act of supplying the updated synchronization scopes policy as an input to a subsequent synchronization.

\* \* \* \* \*